(12) United States Patent
Ton et al.

(10) Patent No.: US 6,701,665 B1
(45) Date of Patent: Mar. 9, 2004

(54) REMOTE PHYTOMONITORING

(75) Inventors: Yuri Ton, Ashkelon (IL); Zohar Ben-Ner, Doar Na Hof Aza (IL)

(73) Assignee: Phytech Ltd., Kibbutz Yad Mordechai (IL)

( * ) Notice: Subject to any disclaimer, the term of this patent is extended or adjusted under 35 U.S.C. 154(b) by 20 days.

(21) Appl. No.: 09/693,824

(22) Filed: Oct. 23, 2000

(51) Int. Cl.$^7$ .............................................. A01B 79/02
(52) U.S. Cl. ........................................ 47/58.1; 47/17
(58) Field of Search ............................ 47/17; 395/800; 364/130, 550, 132, 555.01; 374/135; 709/203

(56) References Cited

U.S. PATENT DOCUMENTS

| | | | | |
|---|---|---|---|---|
| 4,389,706 A | * | 6/1983 | Gomola et al. ............... 364/130 |
| 4,430,828 A | * | 2/1984 | Oglevee et al. ................. 47/17 |
| 4,527,247 A | * | 7/1985 | Kaiser et al. ................ 364/550 |
| 4,569,150 A | | 2/1986 | Carlson et al. |
| 4,638,594 A | | 1/1987 | Huguet et al. |
| 4,647,533 A | | 3/1987 | Weller et al. |
| 4,740,882 A | * | 4/1988 | Miller ......................... 364/132 |
| 4,742,475 A | * | 5/1988 | Kaiser et al. ................ 364/550 |
| 4,755,942 A | | 7/1988 | Gardner et al. |
| 4,856,227 A | * | 8/1989 | Oglevee et al. ................. 47/17 |
| 4,858,377 A | * | 8/1989 | Oglevee et al. ................. 47/17 |
| 4,916,642 A | * | 4/1990 | Kaiser et al. ................ 364/550 |
| 5,001,859 A | * | 3/1991 | Sprung ............................ 47/17 |
| 5,031,358 A | | 7/1991 | Sussman |
| 5,141,332 A | * | 8/1992 | Bergstein ..................... 374/135 |
| 5,299,383 A | | 4/1994 | Takakura et al. |
| 5,572,827 A | | 11/1996 | Conrad |
| 5,598,572 A | * | 1/1997 | Tanikoshi et al. ............ 395/800 |
| 5,735,077 A | | 4/1998 | Warfield, Jr. |
| 5,764,819 A | | 6/1998 | Orr et al. |
| 5,790,424 A | * | 8/1998 | Sugihara et al. ......... 364/555.01 |
| 5,818,734 A | * | 10/1998 | Albright ...................... 364/550 |
| 5,832,423 A | * | 11/1998 | Hochart ....................... 702/188 |
| 5,864,984 A | | 2/1999 | McNerney |
| 6,047,220 A | * | 4/2000 | Eryurek ......................... 700/28 |
| 6,057,266 A | * | 5/2000 | Colvin et al. ................ 504/100 |
| 6,060,314 A | | 5/2000 | Tisserat et al. |
| 6,100,857 A | * | 8/2000 | Tani et al. ...................... 345/1 |
| 6,169,927 B1 | * | 1/2001 | Schonthal et al. .............. 700/1 |
| 6,192,320 B1 | * | 2/2001 | Margrey et al. ............... 702/84 |
| 6,281,790 B1 | * | 8/2001 | Kimmel et al. ............. 340/506 |
| 6,282,454 B1 | * | 8/2001 | Papadopoulos et al. ....... 700/83 |
| 6,304,262 B1 | * | 10/2001 | Maloney et al. ............ 345/418 |
| 6,304,895 B1 | * | 10/2001 | Schneider et al. .......... 709/203 |

FOREIGN PATENT DOCUMENTS

| | | | | |
|---|---|---|---|---|
| EP | 466658 A1 | * | 1/1992 | ........... A01B/45/02 |
| FR | 2650475 A1 | * | 2/1991 | ........... A01G/7/00 |
| FR | 2650476 A1 | * | 2/1991 | ........... A01G/7/00 |
| JP | 043449823 A | * | 12/1992 | |
| JP | 06197645 A | * | 7/1994 | ........... A01G/9/24 |
| WO | WO 9110352 A1 | * | 7/1991 | ........... A01G/9/00 |

* cited by examiner

Primary Examiner—Peter M. Poon
Assistant Examiner—Bethany L Griles
(74) Attorney, Agent, or Firm—G. E. Ehrlich (1995) Ltd.

(57) ABSTRACT

A system for remote monitoring of plants is provided. The system includes (a) at least one sensor positioned on, or in proximity to, a plant, the at least one sensor being for collecting data pertaining to at least one plant related parameter; (b) at least one user client being for receiving and optionally processing the data from the at least one sensor to thereby determine a state of the plant; and (c) a communication network being for communicating the data from the at least one sensor to the at least one user client.

10 Claims, 4 Drawing Sheets

REMOTE PHYTOMONITORING

FIELD AND BACKGROUND OF THE INVENTION

The present invention relates to a system and method for remote phytomonitoring and, more particularly, to a system and method which enable a grower to monitor and optionally control plant growth from a remote location.

Cultivation of commercial crops depends on the monitoring of various parameters of a plant or field. For example, maintaining the correct hydration, which is dependent on several factors including irrigation, scheduling and the like is crucial for the proper development of plants and as such, precise monitoring of the hydration, at any given stage of development is advantageous.

In the past growers have mainly relied on their intuition and expertise in assessing crop conditions. This expertise relied mainly on crop and soil inspection and observing the environmental conditions in which the crop was cultivated.

In recent years, growers have increasingly utilized systems and devices which include arrays of precise sensors for measuring the temperature and humidity and other related parameters of the environment and/or soil proximal to the cultivated plants.

The advent of such precise monitoring technologies and methodologies enabled growers to track and record changes in a field or greenhouse enabling close monitoring, in some cases, of a single plant.

For example, recorded sensor data can be analyzed and the resultant data incorporated into a plant hydration profile, such a profile can then be used to assess crop condition and development through daily and seasonal changes. For further details see, for example, Wolf, B. Diagnostic Technique for Improving Crop Production, Haworth Press, P. 185–187.

Although such methodology has substantially enhanced phytomonitoring, it is still difficult to use since it requires periodical on-site collection of the data recorded by the sensors, a task which can be difficult to achieve in cases of large and remote crops.

In addition, the data provided to a grower utilizing present day systems and methods is presented as numerical data. Such presentation can often be difficult to perceive and analyze and as such requires an experienced operator to decipher.

There is thus a widely recognized need for, and it would be highly advantageous to have, a remote phytomonitoring system and method devoid of the above limitation.

SUMMARY OF THE INVENTION

According to one aspect of the present invention there is provided a system for remote monitoring of plants comprising: (a) at least one sensor positioned on, or in proximity to, a plant, the at least one sensor being for collecting data pertaining to at least one plant related parameter; (b) at least one user client being for receiving and optionally processing the data from the at least one sensor to thereby determine a state of the plant; and (c) a communication network being for communicating the data from the at least one sensor to the at least one user client.

According to further features in preferred embodiments of the invention described below, the at least one sensor is selected from the group consisting of an air humidity detector, an air temperature detector, a boundary diffusion layer resistance detector, a solar radiation detector, a soil moisture detector and a soil temperature detector.

According to still further features in the described preferred embodiments the at least one sensor is selected from the group consisting of a leaf temperature detector, a flower temperature detector, a fruit surface temperature detector, a stem flux relative rate detector, a stem diameter variation detector, a fruit growth rate detector and a leaf $CO_2$ exchange detector.

According to still further features in the described preferred embodiments the at least one sensor includes at least one environmental sensor selected from the group consisting of an air humidity detector, an air temperature detector, a boundary diffusion layer resistance detector, a solar radiation detector, a soil moisture detector and a soil temperature detector, and at least one plant sensor selected from the group consisting of a leaf temperature detector, a flower temperature detector, a fruit surface temperature detector, a stem flux relative rate detector, a stem diameter variation detector, a fruit growth rate detector and a leaf $CO_2$ exchange detector.

According to still further features in the described preferred embodiments the at least one sensor includes a transmitter being for transmitting a signal including the data.

According to still further features in the described preferred embodiments the at least one sensor includes a receiver being for receiving a command signal.

According to still further features in the described preferred embodiments the at least one sensor includes a data storage device being for storing the collected data.

According to still further features in the described preferred embodiments the communication network is selected from the group consisting of a telephone network, a cellular telephone network, a computer network and a satellite network.

According to still further features in the described preferred embodiments the communication network integrates wire and wireless communication.

According to still further features in the described preferred embodiments the at least one sensor includes a plurality of sensors each being in communication with the at least one user client.

According to still further features in the described preferred embodiments the system further comprising a data concentrator being in communication with each of the plurality of sensors and being for relaying the data collected thereby to the at least one user client.

According to still further features in the described preferred embodiments the communication between the data concentrator and each of the plurality of sensors is effected via wire or wireless communication.

According to still further features in the described preferred embodiments the wireless communication is selected from the group consisting of infrared communication, and radiofrequency communication.

According to still further features in the described preferred embodiments the at least one user client is selected from the group consisting of a PDA and a computer.

According to still further features in the described preferred embodiments the system further comprising at least one device being in communication with the at least one user client via the communication network, the device being for modifying the state of the plant or crop including the plant.

According to still further features in the described preferred embodiments the device is selected from the group consisting of an irrigation device and a climate controller.

According to another aspect of the present invention there is provided a method of remote monitoring of plants comprising the steps of: (a) collecting on-site data pertaining to at least one plant related parameter; (b) relaying the data to a remote user client via a communication network; and (c) processing the data to thereby determine a state of the plants.

According to still further features in the described preferred embodiments step (a) is effected by at least one sensor positioned on, or in proximity to, a plant.

According to still further features in the described preferred embodiments the communication network is selected from the group consisting of a telephone network, a cellular telephone network, a computer network and a satellite network.

According to still further features in the described preferred embodiments the communication network integrates wire and wireless communication.

According to yet another aspect of the present invention there is provided a phytosensor comprising: (a) a sensing unit being for collecting data pertaining to a plant related parameter; and (b) a transmitter being for generating a signal including the data.

According to still further features in the described preferred embodiments the phytosensor further comprising a data storage device being for storing the data collected by the sensing unit.

According to still further features in the described preferred embodiments the data collected by the sensing unit is selected from the group consisting of air humidity data, air temperature data, wind speed or boundary diffusion layer resistance data, solar radiation data, soil moisture data, soil temperature data, leaf temperature data, flower temperature data, fruit surface temperature data, stem flux relative rate data, stem diameter variation data, fruit growth rate data and leaf $CO_2$ exchange data.

The present invention successfully addresses the shortcomings of the presently known configurations by providing a phytomonitoring system which enables a grower to monitor and optionally control plant growth from a remote location.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
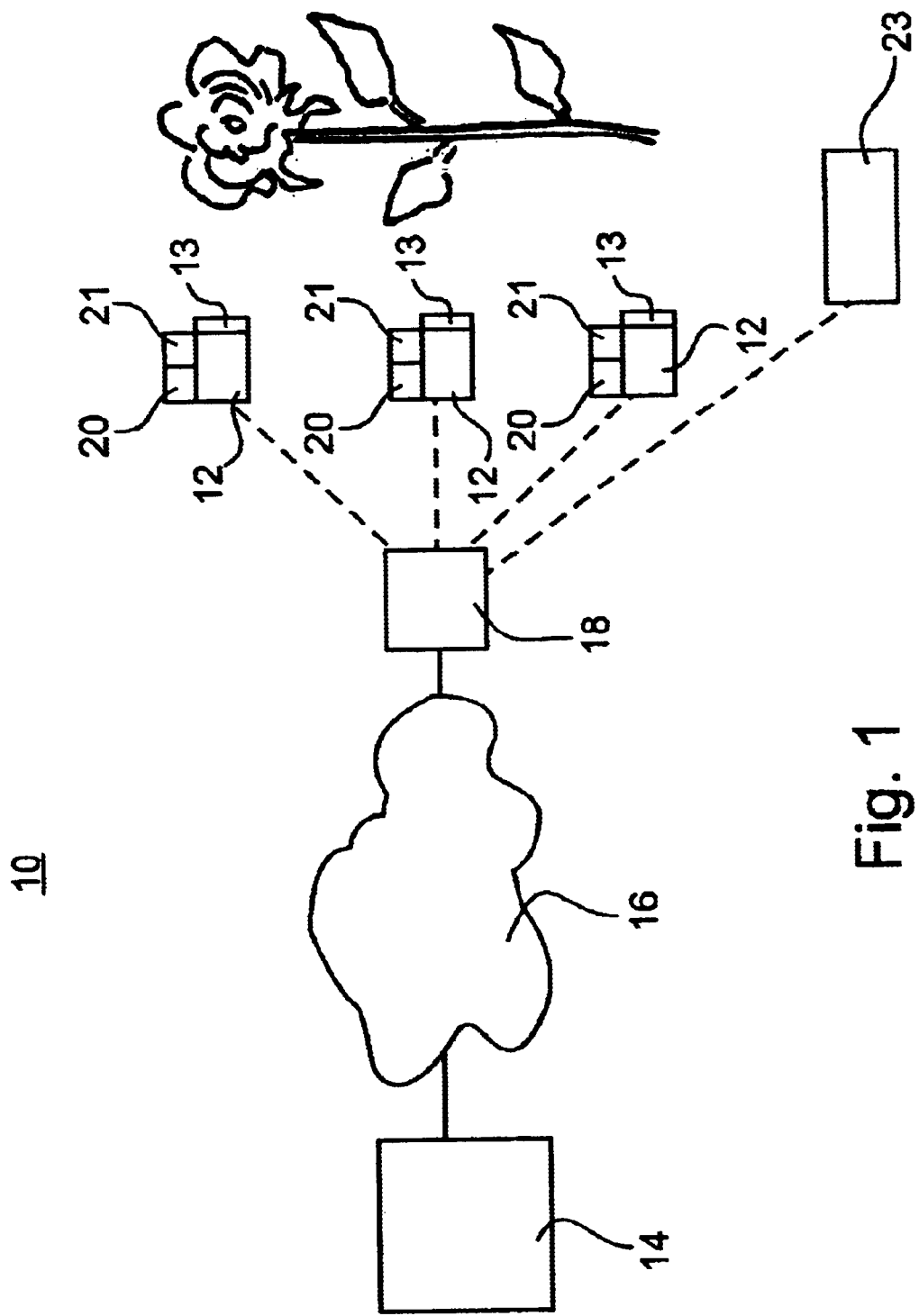
FIG. 1 illustrates one embodiment of the system for remote monitoring of plants according to the teachings of the present invention.

The present invention is of a phytomonitoring system and method which can be used to determine a state of a plant or a crop from a remote location.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates the system for remote monitoring of plants which is referred to hereinunder as system 10.

System 10 includes one or preferably a plurality of sensors 12, each positioned on, or in proximity to, a plant such as a greenhouse grown plant or a field grown plant. Each of sensors 12 is preferably self powered by a power source such as, for example, a battery provided with, for example, a solar panel for recharging.

Each of sensors 12 serves for collecting data pertaining to a specific plant related parameter. Such data is collected by these sensors from the plant environment and/or from the plant itself. Examples of parameter data include but are not limited to, air humidity data, air temperature data, wind speed or boundary diffusion layer resistance data, solar radiation data, soil moisture data, soil temperature data, leaf temperature data, flower temperature data, fruit surface temperature data, stem flux relative rate data, stem diameter variation data, fruit growth rate data and leaf $CO_2$ exchange data.

Such data is collected either continuously or preferably periodically by sensors 12 and preferably stored in a data storage device 13 thereof. Storage device 13 can be, for example, a magnetic storage device such as a RAM chip.

System 10 further includes at least one user client 14 which serves for receiving and optionally processing the data collected by sensors 12.

As used herein, the phrase "user client" generally refers to a computer and includes, but is not limited to, personal computers (PC) having an operating system such as DOS, Windows, OS/2™ or Linux, Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system; personal digital assistants (PDA), cellular telephones having Internet capabilities (e.g., wireless application protocol, WAP) and Web TVs.

For purposes of this specification, the term "Windows™" includes, but is not limited to, Windows2000™, Windows95™, Windows 3.x™ in which "x" is an integer such as "1", Windows NT™, Windows98™, Windows CE™ and any upgraded versions of these operating systems by Microsoft Corp. (USA).

System 10 also includes a communication network 16 which facilitates the communication of data from sensor 12 to client 14.

Communication network can be a computer, telephone (e.g. cellular) or satellite network or any combination thereof. For example, communication network 16 can be a combination of a cellular network and a computer network (e.g. the Internet) as specifically shown in FIG. 3 which is described in detail hereinbelow.

Thus, system 10 of the present invention enables communication of sensor data to remote client 14, to thereby enable an operator of client 14 which is remote from the plant to receive such data. The state of the plant, which can be a disease state, growth state, hydration state and the like or the state of a crop including the plant, can then be determined by data processing or by simply comparing sensor data collected over a period of time.

Figure 4:
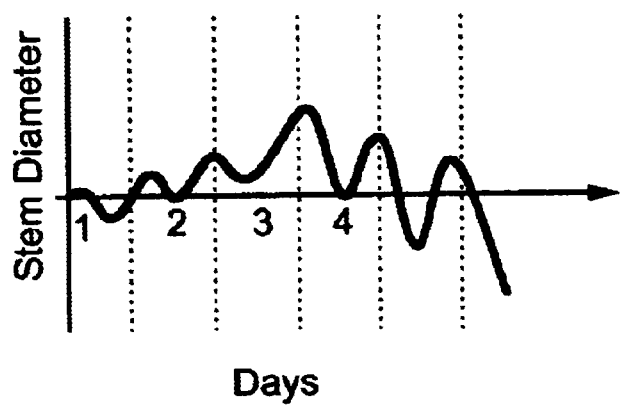
FIG. 4 is a graph illustrating plant stem diameter variation as a function of time.

For example, as is specifically shown in FIG. 4, data collected over time from a stem diameter variation sensor (e.g., SD-5, Phytech LTD., Israel) can be utilized to construct a hydration and growth state curve.

Since stem diameter variation is affected by the water state of a plant, measurement of stem diameter over time can provide an indication of plant state. Thus, a general positive trend in stem diameter is indicative of normal plant hydration and growth (days 1, 2 and 3), while a negative trend can be indicative of suboptimal plant hydration (following day 4).

Fruit diameter variation can also serve as an indication of plant state. For example, as is specifically shown in FIG. 5, a tomato fruit growth data obtained over time by a Fruit Growth Sensor (e.g., FI-3EA, Phytech LTD., Israel) can be utilized to construct a plant state curve.

Thus, the fruit diameter shrinkage observed during days 2 and 3 can be indicative of a physiological disorder or water stress, while the normal fruit diameter variation observed during days 4 and 5 indicates normal plant state and ample watering.

A diurnal interrelation between sap flow rate and air vapor pressure deficit (Air VPD) can also be utilized to asses a plant's state. For example, as is specifically shown in FIG. 6, data obtained from a sap flow sensor (e.g., SF-4, Phytech, LTD., Israel) and an air temperature and humidity sensor (ATII-3, Phytech, LTD., Israel) can be utilized to construct a water state curve.

The linear curve observed from 8:00 till 12:00 is evidence of unlimited transpiration, while the loop-like diurnal curve observed from 12:00 on, is indicative of reduced transpiration which is most likely due to stomatal response.

Figure 5:
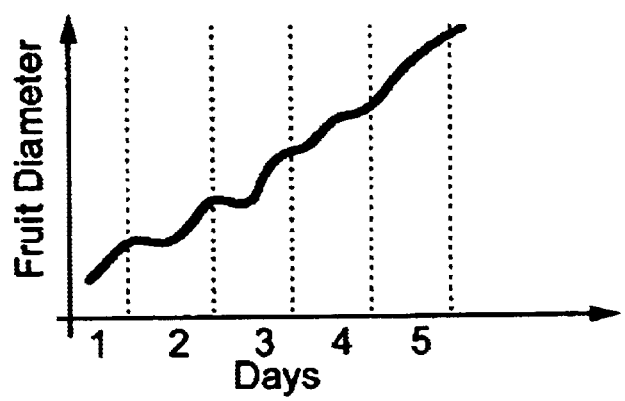
FIG. 5 is a graph illustrating fruit diameter variation as a function of time.
Figure 6:
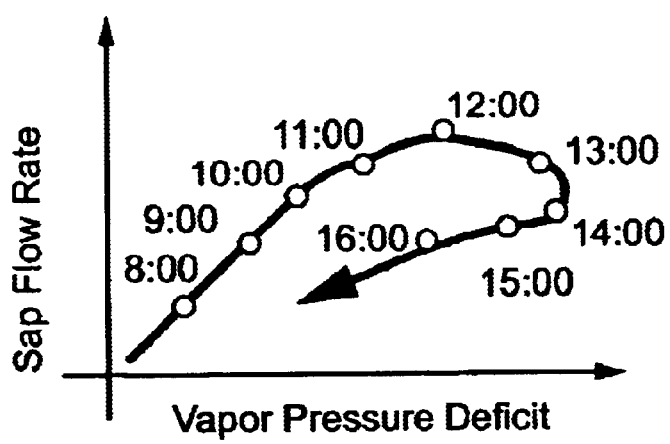
FIG. 6 is a graph illustrating sap flow rate as a function of vapor pressure deficit.

Sensor provided data and/or analysis results, such as the graphs illustrated by FIGS. 4–6, are preferably communicated to an operator via a display of user client 14.

Preferably, the numerical, graph, or table presented results are displayed in a manner which is easily comprehended by the operator. For example, various color schemes, or additional audio data can be utilized to enhance results of importance.

According to a preferred embodiment of the present invention, system 10 further includes a data concentrator 18, which communicates with each of sensors 12. Data concentrator 18 serves for collecting sensor data and relaying such data to client 14 via communication network 16. A detailed description of concentrator 18 is given hereinunder with reference to FIG. 2.

According to another preferred embodiment of the present invention, communication between sensors 12 and concentrator 18 is effected via RF communication although direct wire communication can also be utilized.

To this end, each of sensors 12 include a transmitter 20 which serves for generating an RF signal which includes the sensor collected (and optionally stored) data described above.

Preferably, each of sensors 12 also include a receiver 21 which serves for receiving a command signal from concentrator 18; receiver 21 can be integrated with transmitter 20 into a single transceiver device. Such a command signal can either originate from client 14 or from concentrator 18 and serves for initiating data collection from a sensor 12, for verifying sensor integrity and the like.

Figure 2:
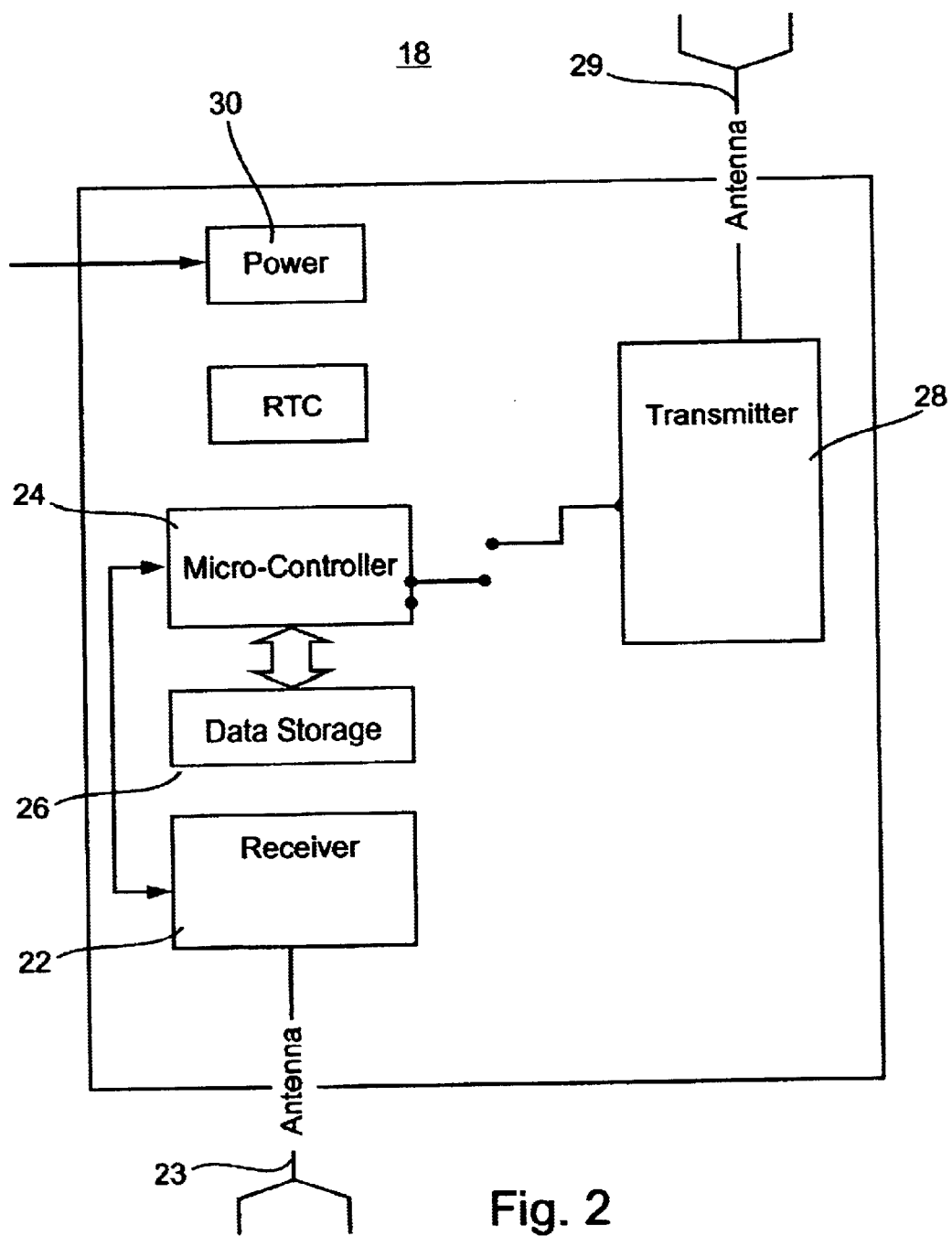
FIG. 2 is a schematic depiction of the data concentrator utilized by the system of the present invention.

As is specifically shown in FIG. 2, to receive sensor data, concentrator 18 includes a receiver 22 provided with an antenna 23. Upon receipt, the signal is processed by microcontroller 24 and optionally stored in data storage 26. Following collection of signals from various sensors 12, concentrator 18 transmits a signal, via transmitter 28 and antenna 29, which signal includes the sensor collected data. Preferably, transmitter 28 includes a modem capable of communicating with a public wireless network such as a cellular network. Transmitter 28 can also serve for generating the command signal described above.

Concentrator 18 also includes a power source 30 which serves for powering the various functions of concentrator 18. Power source 30 can be, for example, a Wall-mounted transformer of 120/240 AC 24 VAC or 120/240 AC 12 VDC of 1000 mA. In such a case, concentrator 18 also includes a voltage regulator in order to stabilize logic and transmitter/receiver power. Alternatively, power source 30 can be a battery rechargeable via a solar panel.

The signal produced by concentrator 18 is relayed by communication network 16 to client 14 and utilized for determining a state of a plant as described above. Thus, concentrator 18 serves as a router for routing data collected by any number of sensors 12 to client 14.

Preferably, concentrator 18 also serves for mapping sensors 12 communicating therewith. This feature of concentrator 18 enables automatic registration and operation of a sensor 12 which is added to a particular plant or sensor set.

According to another preferred embodiment of the present invention, system 10 can also be utilized to modify the state of the plant monitored or the crop including the plant monitored according to the monitored sensor data.

As is specifically shown in FIG. 1, and according to this preferred embodiment, system 10 further includes a device 23 which communicates with client 14 via communication network 16 and preferably concentrator 18. Device 23 can be, for example, an irrigation device, a climate controller, a pruning device and/or any other device capable of modifying the state of the plant or crop including same.

Figure 3:
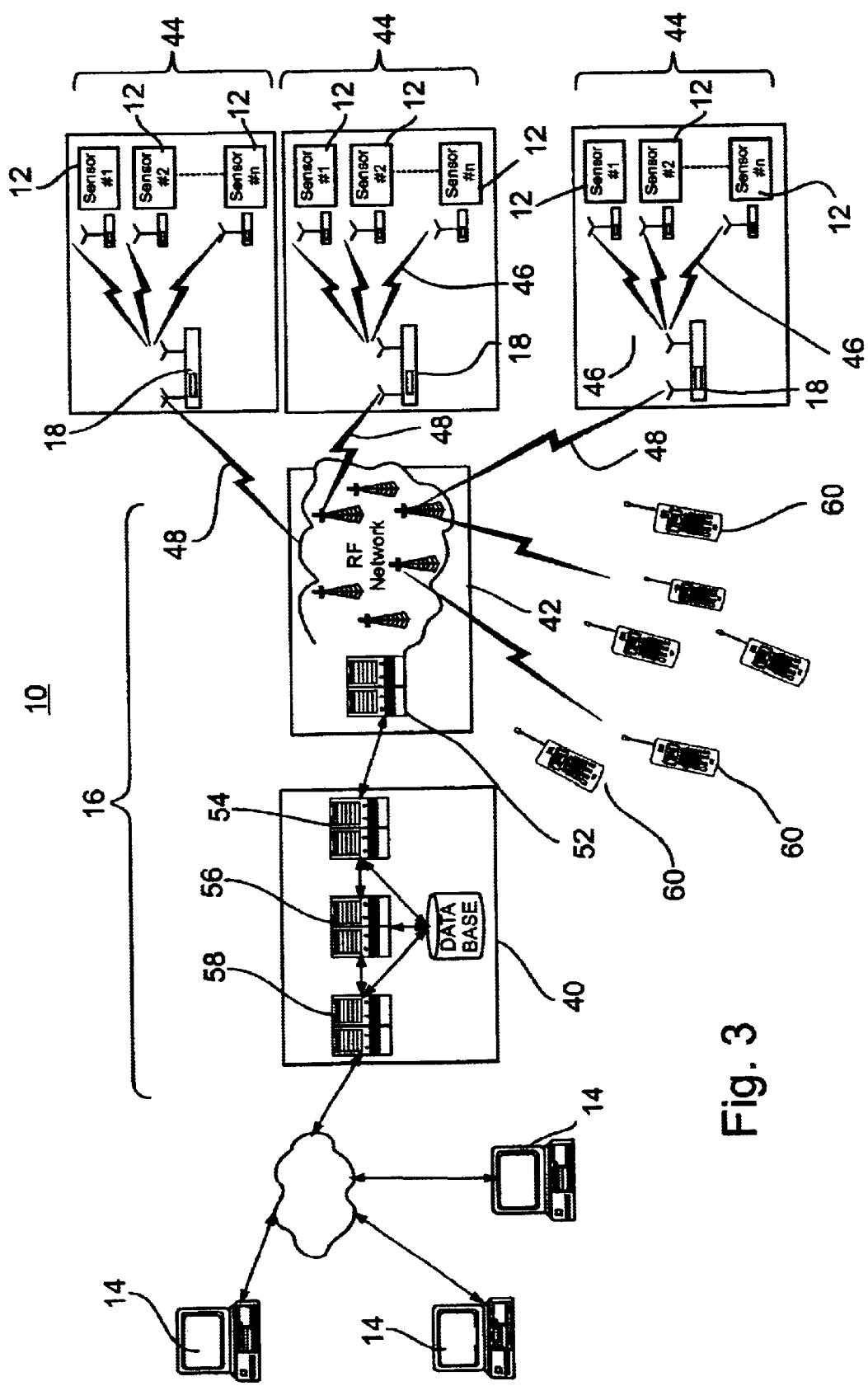
FIG. 3 illustrates another embodiment of the system for remote monitoring of plants according to the teachings of the present invention.

FIG. 3 illustrates one specific configuration of system 10. According to this configuration, system 10 utilizes a computer network 40 and a cellular network 42 for communication between concentrators 18 and clients 14.

This configuration illustrates data collection from three concentrators 18 each collecting data from a sensor set 44 including three sensors 12. A signal collected by each sensor 12 of sensor set 44 is relayed to a specific concentrator 18 via an RF signal 46. Following accumulation of data from sensor set 44 over a predetermined period of time (e.g. a day), concentrator 18 relays a signal 48 including the accumulated sensor data to a receiver 50 of cellular communication network 42. This signal is routed by a communication server 52 of cellular network 42 to a communication server 54 of computer network 40.

The data is then processed by an application server 56 and displayed or communicated to client(s) 14 via server 58.

Preferably, computer network 40 is the World Wide Web and as such, server 58 is a Web server capable of storing and displaying a Web site. In this case, an operator of client 14 can view the data collected from the sensors via a Web browser program operating in client 14.

Processing of data to enable determination of the plant state can be effected either by application server 56 or by client 14 using client stored software or Web server 58 provided on-line analysis tools.

It will be appreciated that when processing is effected by application server 56, alerts of plant state (e.g. hydration state) can be issued to portable device 60 (e.g. cell phone or beeper) of an operator either automatically or on demand. This feature of system 10 enables an operator which is away from client 14 to still track and monitor plant state.

It will further be appreciated that automatic processing also enables automatic control over device 23 described hereinabove with reference to FIG. 1.

As used herein, the term "Web site" is used to refer to at least one Web page, and preferably a plurality of Web pages, virtually connected to form a coherent group of interlinked documents.

As used herein, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Uniform Resource Locator).

As used herein, the phrase "Web browser" or the term "browser" refers to any software application which can display text, graphics, or both, from Web pages on World Wide Web sites. Examples of Web browsers include, Netscape navigator, Internet Explorer, Opera, iCab and the like.

Thus, the present invention enables remote monitoring of plants or crops. By carefully selecting plants as crop standards, and by relaying the sensor data collected therefrom to an operator situated anywhere on the globe, the system of the present invention enables a grower to track crops grown in remote location over extended time periods. In addition, the system of the present invention enables a grower to similarly track the state of the crop via a portable communication device, such as a cellular phone.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of remote monitoring of a field grown crop, the method comprising:
   (a) collecting on-site data pertaining to at least one plant derived parameter selected from the group consisting of a leaf temperature, a flower temperature, a fruit surface temperature, a stem flux relative rate, a stem diameter variation, a fruit growth rate and a leaf $CO_2$ exchange;
   (b) relaying said data to a remote user client via a communication network; and
   (c) processing said data to thereby determine a state of the crop.

2. The method of claim 1, wherein step (a) is effected by at least one sensor positioned on a plant of the crop.

3. The method of claim 1, wherein said communication network is selected from the group consisting of a telephone network, a cellular telephone network, a computer network and a satellite network.

4. The method of claim 1, wherein said communication network integrates wire and wireless communication.

5. The method of claim 1, wherein step (a) is effected by at least one sensor positioned in proximity to said plant of the crop.

6. A method of remote monitoring of a greenhouse grown crop, the method comprising:
   (a) collecting on-site data pertaining to at least one plant derived parameter selected from the group consisting of a leaf temperature, a flower temperature, a fruit surface temperature, a stem flux relative rate, a stem diameter variation, a fruit growth rate and a leaf $CO_2$ exchange;
   (b) relaying said data to a remote user client via a communication network; and
   (c) processing said data to thereby determine a state of the greenhouse grown crop.

7. The method of claim 6, wherein step (a) is effected by at least one sensor positioned on a plant of the greenhouse grown crop.

8. The method of claim 6, wherein said communication network is selected from the group consisting of a telephone network, a cellular telephone network, a computer network and a satellite network.

9. The method of claim 6, wherein said communication network integrates wire and wireless communication.

10. The method of claim 6, wherein step (a) is effected by at least one sensor positioned in proximity to a plant of the crop.

* * * * *